United States Patent
Ossmer et al.

(10) Patent No.: US 10,935,152 B2
(45) Date of Patent: Mar. 2, 2021

(54) VALVE HAVING AN ACTUATOR MADE OF A SHAPE MEMORY ALLOY, WITH A FLAT GEOMETRY

(71) Applicant: memetis GmbH, Karlsruhe (DE)

(72) Inventors: Hinnerk Ossmer, Stutensee (DE); Christoph Wessendorf, Karlsruhe (DE); Christof Megnin, Speyer (DE); Marcel Gueltig, Karlsruhe (DE)

(73) Assignee: memetis GmbH, Karlsruhe (DE)

( * ) Notice: Subject to any disclaimer, the term of this patent is extended or adjusted under 35 U.S.C. 154(b) by 14 days.

(21) Appl. No.: 16/411,263

(22) Filed: May 14, 2019

(65) Prior Publication Data

US 2019/0353269 A1    Nov. 21, 2019

(30) Foreign Application Priority Data

May 18, 2018   (DE) ...................... 10 2018 112 065.6

(51) Int. Cl.
*F16K 31/02*       (2006.01)
(52) U.S. Cl.
CPC ............ *F16K 31/02* (2013.01); *F16K 31/025* (2013.01)
(58) Field of Classification Search
CPC .... F03G 7/065; F16K 31/002; F16K 99/0009; F16K 99/0015; F16K 31/02;
(Continued)

(56) References Cited

U.S. PATENT DOCUMENTS

| | | | | |
|---|---|---|---|---|
| 1,536,424 A | * | 5/1925 | Cowley | B65G 51/16 406/17 |
| 1,773,726 A | * | 8/1930 | Deming | F16K 17/085 137/522 |

(Continued)

FOREIGN PATENT DOCUMENTS

| | | |
|---|---|---|
| DE | 36 35 216 A1 | 4/1988 |
| DE | 198 21 841 C1 | 6/1999 |

(Continued)

OTHER PUBLICATIONS

German Office Action dated Feb. 20, 2019 in German Application No. 10 2018 112 065.6 with English translation fo the relevant parts.

(Continued)

*Primary Examiner* — Seth W. MacKay-Smith
(74) *Attorney, Agent, or Firm* — Collard & Roe, P.C.

(57) ABSTRACT

A valve for switching of media, such as liquids or gases, is opened, closed or put into an intermediate state by at least one actuator produced from a shape memory alloy. The at least one actuator, as a function of whether electricity is applied to it, acts on at least one valve ball or a valve plunger accommodated in a core element, so that the through-flow of a medium through a fluid part below the core element, with a media-tight membrane interposed between, is opened, interrupted or partially opened in regulated or controlled manner. The core element is produced from a mechanically rigid and thermally well-conductive material, has electrical conductor tracks for electrical connection of the actuator to a supply of electricity on the top side, as well as multiple threaded through-holes for underside connection with the fluid part and the membrane and/or for top-side connection with the actuator.

21 Claims, 16 Drawing Sheets

(58) Field of Classification Search
CPC .............. F16K 31/025; F16K 99/0023; F16K 99/0028; F16K 99/0038; F16K 2099/0069; F16K 2099/008; F16K 2099/0086
USPC .............................................. 251/11, 129.06
See application file for complete search history.

(56) References Cited

U.S. PATENT DOCUMENTS

| | | | | |
|---|---|---|---|---|
| 2,051,350 | A * | 8/1936 | Smith | F16K 1/34 137/242 |
| 2,225,201 | A * | 12/1940 | Anderson | A61M 16/104 128/204.21 |
| 2,464,400 | A * | 3/1949 | Hooper | F16K 15/18 251/277 |
| 3,344,672 | A * | 10/1967 | Lingnau | F16T 1/08 251/11 |
| 4,750,520 | A | 6/1988 | Heim et al. | |
| 5,281,013 | A * | 1/1994 | Pichon | B60T 8/368 303/116.4 |
| 5,325,880 | A * | 7/1994 | Johnson | F15C 3/04 137/1 |
| 5,640,995 | A * | 6/1997 | Packard | F15C 5/00 137/597 |
| 5,671,905 | A * | 9/1997 | Hopkins, Jr. | F03C 7/00 251/129.01 |
| 5,691,977 | A | 11/1997 | Yoshimura et al. | |
| 5,984,258 | A * | 11/1999 | Knebel | F02M 51/06 137/339 |
| 6,691,977 | B2 * | 2/2004 | Knebel | G05D 23/025 239/553.3 |
| 6,729,599 | B2 * | 5/2004 | Johnson | F15C 5/00 251/11 |
| 6,883,774 | B2 * | 4/2005 | Nielsen | F15C 5/00 251/11 |
| 6,991,213 | B2 * | 1/2006 | Wang | G01L 9/0072 251/129.01 |
| 8,141,792 | B2 * | 3/2012 | Yokoi | G05D 16/0647 236/94 |
| 8,714,199 | B2 * | 5/2014 | Deperraz | F16K 31/025 137/840 |
| 8,740,045 | B2 * | 6/2014 | Stadelbauer | F16K 99/0038 228/160 |
| 9,267,616 | B2 * | 2/2016 | Gumbrecht | B01L 7/52 |
| 9,267,617 | B2 * | 2/2016 | Stadelbauer | F16K 31/025 |
| 9,555,410 | B2 * | 1/2017 | Brammer | B01L 3/50273 |
| 9,579,652 | B2 * | 2/2017 | Asai | B01L 3/502738 |
| 10,072,640 | B2 * | 9/2018 | Asai | B01L 3/502738 |
| 2018/0348025 | A1 * | 12/2018 | Jahromi | F03G 7/065 |

FOREIGN PATENT DOCUMENTS

| | | |
|---|---|---|
| DE | 199 63 499 A1 | 2/2001 |
| DE | 10 2004 059 188 A1 | 3/2006 |
| DE | 10 2005 060 217 A1 | 7/2006 |
| DE | 10 2008 027 325 B4 | 9/2010 |
| DE | 10 2010 015 447 A1 | 10/2011 |

OTHER PUBLICATIONS

Johannes Barth, Christoph Megnin and Manfred Kohl, "A Bistable Shape Memory Alloy Microvalve With Magnetostatic Latches," Journal of Microelectromechanical System, vol. 21, No. 1, Feb. 2012, total of 9 pages.

* cited by examiner

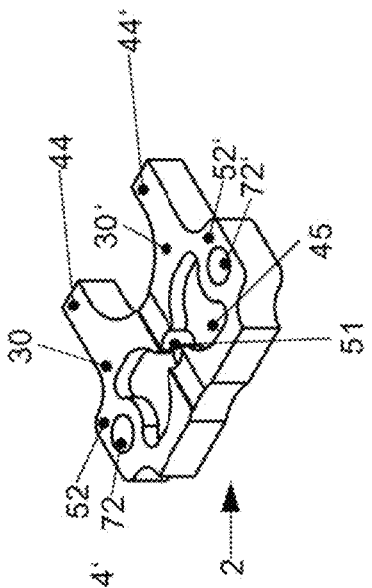
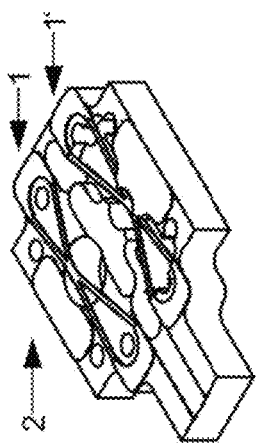
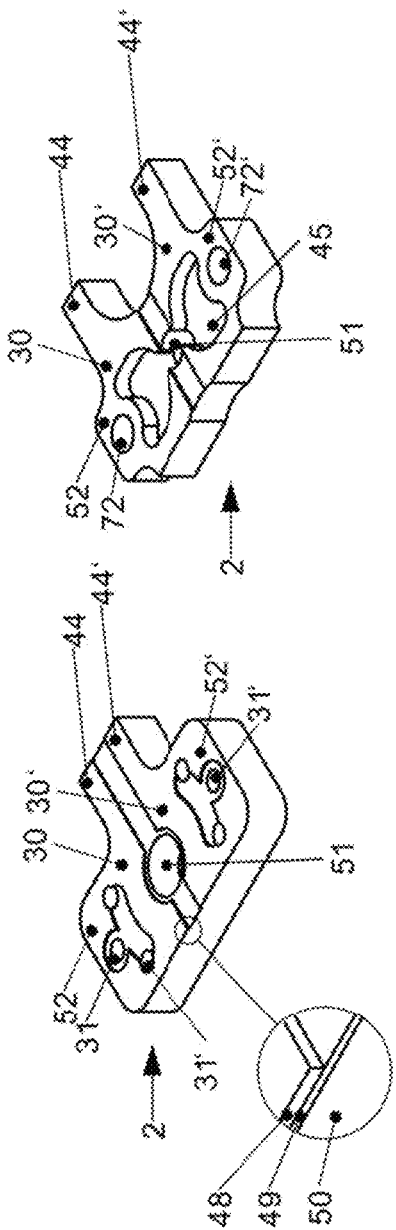
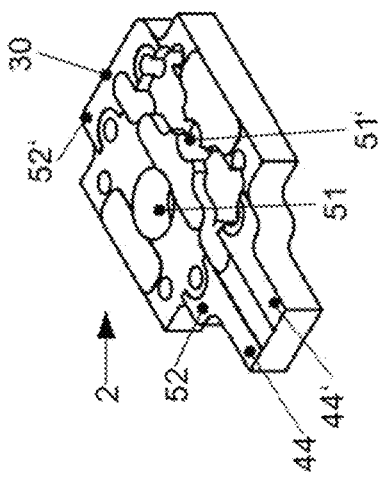

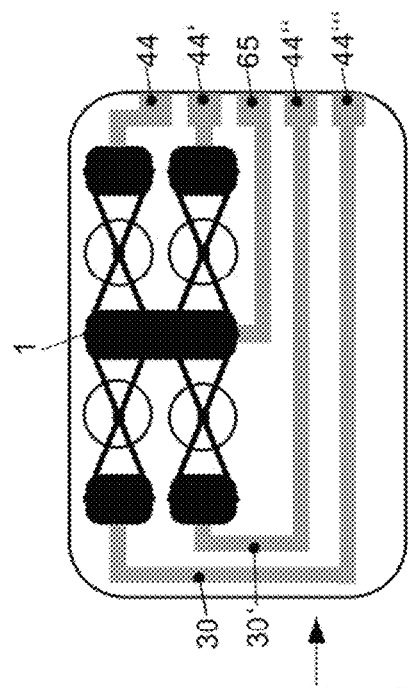
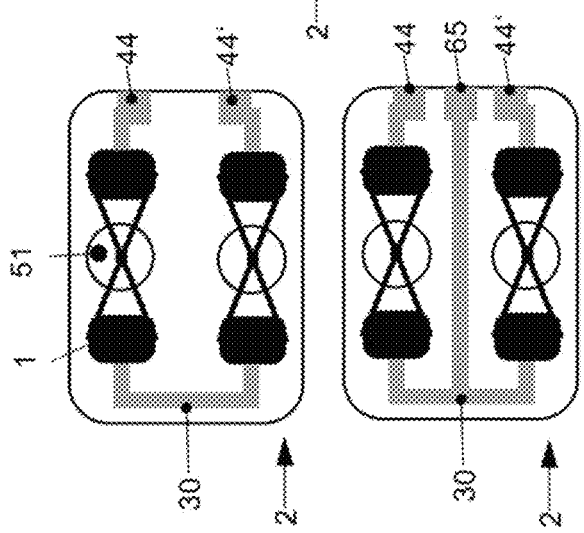
Fig. 3G
Fig. 3E
Fig. 3F

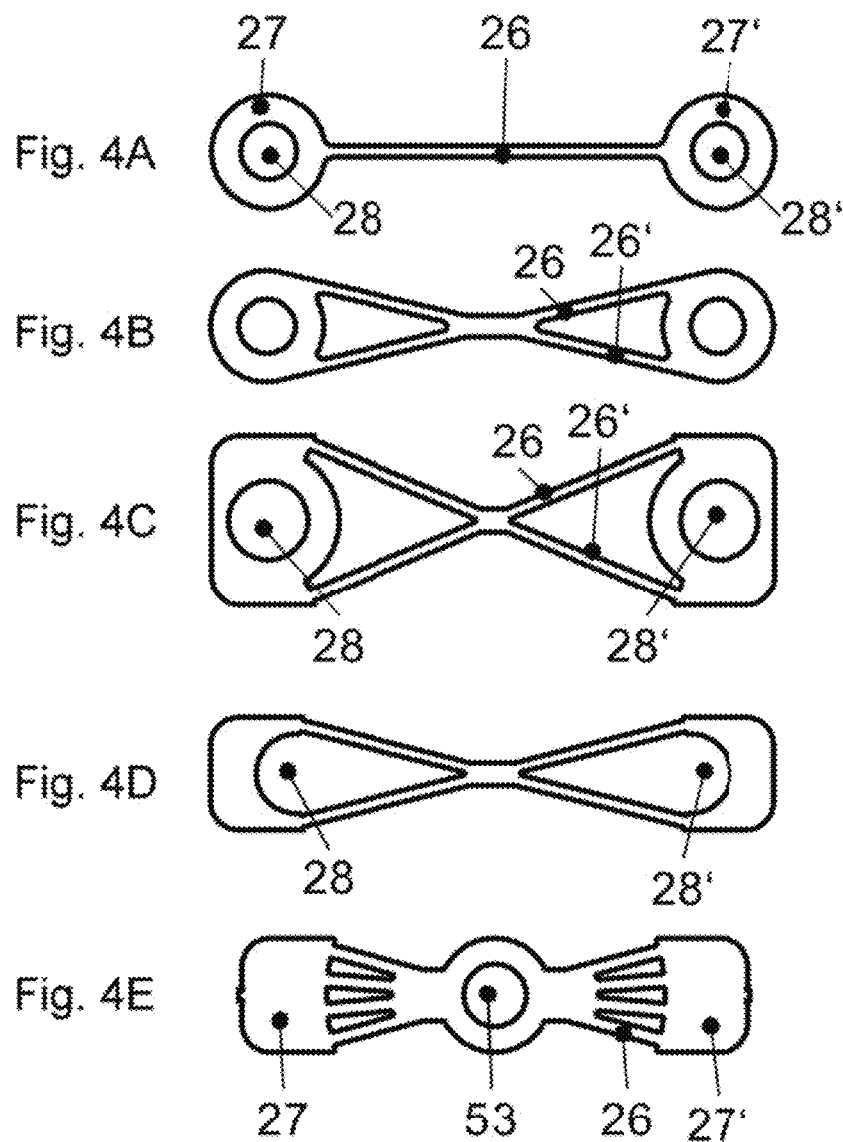

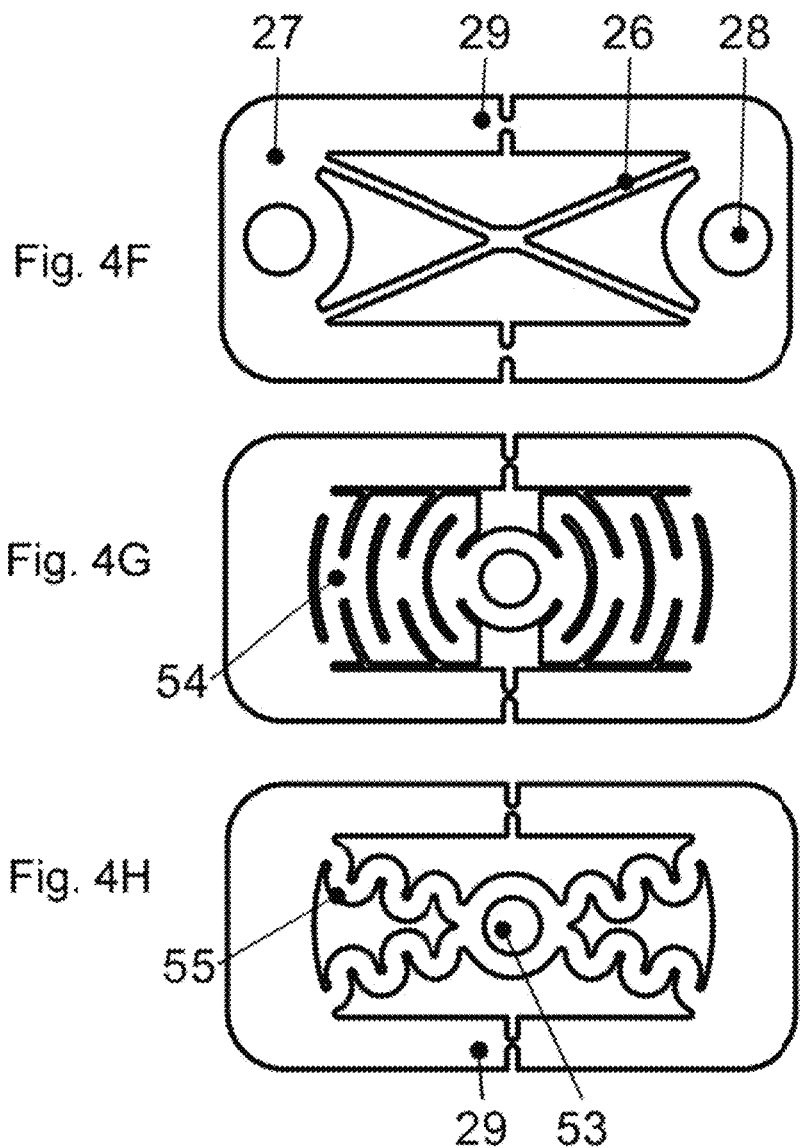

27  56

VALVE HAVING AN ACTUATOR MADE OF A SHAPE MEMORY ALLOY, WITH A FLAT GEOMETRY

CROSS REFERENCE TO RELATED APPLICATIONS

Applicant claims priority under 35 U.S.C. § 119 of German Application No. 10 2018 112 065.6 filed May 18, 2018, the disclosure of which is incorporated by reference.

BACKGROUND OF THE INVENTION

1. Field of the Invention

The invention relates to a valve having an actuator made of a shape memory alloy, with a flat geometry, for switching of media, in particular of liquids or gases, wherein the valve is to be opened and/or closed by means of an actuator, which is produced from a shape memory alloy, referred to briefly as SMA hereinafter, and/or can be put into a defined intermediate state between open and closed.

2. Description of the Related Art

In this connection, an electronically controllable valve, in particular for gaseous media, is previously known from DE 36 35 216 A1. The previously-known valve can be opened and/or closed by means of at least one actuator. In this regard, at least one plunger accommodated in a core element is overlapped by at least one actuator, in such a manner that the plunger is adjustable in height, in such a manner that in this way, a media-tight membrane disposed below the valve plunger opens up, interrupts or partially opens up the through-flow of a medium through a fluid part disposed below the membrane. In this regard, an actuator through which current flows is deformed in the direction of its flat memory shape, and thereby releases the valve plunger. In this state, the valve is open. If the supply of electricity is interrupted, the actuator presses the valve plunger against the valve seat, so that the valve is closed. In this regard, the aforementioned core element is produced from a mechanically rigid and thermally well-conductive material.

Furthermore, a further valve is previously known from DE 10 2005 060 217 A1, in which the actuator is produced from a shape memory alloy. This valve has a valve housing, which encloses a pressure chamber, wherein at least two valve openings open into this pressure chamber. The previously-known valve is used to control the pressure in the aforementioned pressure chamber.

Furthermore, a valve arrangement having a ball valve is previously known from DE 199 63 499 A1, in which triggering and resetting of the ball valve takes place by means of an SMA actuator. According to the previously-known solution, the SMA actuator can be deflected by means of application of heat by way of a heating system connected with the actuator, in such a manner that a valve plunger is pressed onto a valve seat (normally open valve). Alternatively, the valve can also be structured in such a manner that the valve body lifts up from a valve seat as the result of application of heat to the SMA actuator (normally closed valve). In the latter case, a closing spring is assigned to the actuator as a reset element.

An actuator made of an SMA material in a valve function is also known from DE 10 2004 059 188 A1, wherein here, too, the actuator is produced or the actuators are produced also from an SMA flat material; however, they are arranged in a stack in the sense of an "accordion," wherein additional electrical connections for power supply are required.

Also, it is known from this state of the art to provide multiple actuators, wherein these actuators can also be used as opposing players, so as to reset other actuators. This state of the art, however, is not used for switching of fluids.

Again, the use of two SMA actuators that are switched opposite to one another, so as to perform setting movements, is known from DE 10 2010 015 447 A1.

Furthermore, it is known from U.S. Pat. No. 6,691,977 B2 as well as from U.S. Pat. No. 5,325,880 to use a flat-form actuator made from an SMA alloy as a valve plunger, which is at first held down by a spring, wherein as the result of application of electricity, in other words as the result of heating of the SMA actuator, the spring is compressed and the valve plunger is lifted, in other words the valve is opened.

Furthermore, it is previously known from DE 198 21 841 C1 to configure SMA actuators having an extremely flat structure, which are configured as film elements, in the form of bending beams disposed in circular shape.

Furthermore, it is known from the state of the art to build up an SMA micro-valve, wherein the actuators are attached in a housing by means of adhesive film (Johannes Barth, Christoph Megnin and Manfred Kohl, Journal of Microelectromechanical Systems, Vol. 21, No. 1, February 2012).

Furthermore, it is known from DE 10 2008 027 325 B4 to use SMA flat-form actuators having bridge arms that are deflected out of the plane, as well as meander-shaped SMA actuators, which act as antagonists in the plane.

SUMMARY OF THE INVENTION

Proceeding from this prior art, the invention proposes assigning at least one actuator to a valve ball accommodated in a core element or a valve plunger accommodated in this core element, in such a manner that when current is applied to the actuator, in other words when it is heated, the related expansion of the actuator brings about a press-down force, which presses the valve ball or the valve plunger into the valve seat. In this way, a membrane disposed below the valve plunger or the valve ball interrupts the through-flow of a fluid part disposed below the core element. Subsequently, upon interruption of the supply of electricity connected with the actuator, the valve ball or the valve plunger releases the valve seat again, and as a result, the through-flow of a medium through the said fluid part is opened again.

In this regard, the core element forms a central component of the valve. It serves not only to guide the valve plunger or the valve ball in a suitable central opening, but also for electrical contacting of the SMA flat-form actuator by means of conductor tracks disposed on the surface of the core element and electrically insulated from it, for effective heat dissipation from the actuator after the current is shut off, by way of a suitable, highly heat-conductive core material, as well as also for mechanical attachment of all further valve components by means of screws that engage into threads in the core element.

The membrane disposed below the valve ball or the valve plunger brings about the result that the medium guided through the fluid part remains exclusively within the fluid part, in other words both when the valve seat is open and when it is closed, as well as in all conceivable intermediate positions. The media switched by means of the valve arrangement are therefore completely uncoupled from the valve arrangement, so that by means of this gas-tight and liquid-tight separation of the media to be switched, additional applications occur for these micro-valve arrangements, such as, for example, in the medical sector or in the case of use of this technology in critical environments.

Based on the shape memory inherent in the SMA actuator, the interrupted flow connection through the fluid part can be opened up again in simple manner, in that the application of current to the actuator is interrupted, thereby the valve seat is released again and thus the valve is opened, in other words the through-flow through the fluid part is opened up.

In a concrete application in the normally open valve variant, the situation is that when electricity is flowing, the actuator deforms in the direction of its flat memory shape, and thereby the valve ball or the valve plunger presses down on the membrane and this membrane in turn presses down on the valve seat, so that the valve closes and thereby interrupts the through-flow of medium through the fluid part, as intended, whereas the valve releases the valve plunger or the valve ball when the supply of electricity is interrupted, so that the valve opens and thereby permits the through-flow of medium through the fluid part, as intended.

In yet another advantageous alternative embodiment as a normally closed valve, the actuator element has a reset element, preferably a reset spring assigned to it, which is clamped in place between the lid element and the actuator, in such a manner that the spring force in the current-free state of the actuator is sufficient to press the valve ball or the valve plunger onto the membrane, and the membrane in turn onto the valve seat, so that the valve closes and thereby interrupts the through-flow of medium through the fluid part, as intended. In contrast, as soon as electricity is applied to the actuator, it deforms, counter to the spring force, in the direction of its flat memory shape, thereby compressing the reset spring and thus releasing the valve ball or the valve plunger, so that a flow of medium through the valve seat/the media chamber can take place.

In a concrete embodiment, the core element is encompassed from above, on its top side, by a lid element, with the interposition of the actuator that has already been mentioned, wherein the core element is encompassed from below, on its underside, by a fluid part, wherein this fluid part has a medium inflow and a medium outflow, wherein the flow connection opened up by means of the fluid part can be interrupted, released, or also adjusted with regard to the through-flow amount, in an intermediate position, by means of the actuator, as discussed in detail.

In a further embodiment, the lid element is screwed onto the core element by means of at least two screws, spaced apart from one another, with the interposition of the actuator and the at least one valve ball or the at least one valve plunger. This arrangement opens up the possibility of removing the lid element, either for repair purposes or also for replacement of the actuator disposed below the lid element. In particular, however, the most varied actuators can be exchanged in the module that is otherwise the same, consisting of the lid element, the core element, and the fluid part disposed on the underside, in the sense of a kit, and configured on the valve arrangement with adaptation to the respective requirements.

According to an embodiment of the invention, the media inflow opens into a fluid chamber of the fluid part, which chamber is followed, in the flow direction of the supplied medium, by a media shut-off, also within the fluid part. In this regard, the valve seat is disposed within this fluid chamber, with either a valve ball or a valve plunger assigned to the seat in such a manner that under the effect of the actuator, to which electricity is applied, the valve ball or the valve plunger is pressed against the valve seat, specifically with the interposition of a membrane disposed below the core element, which membrane interrupts the media through-flow through the fluid part for as long as electricity is applied to the actuator. Because this membrane is configured to be liquid-tight, the media passed through the fluid part enter into connection with or contact exclusively the fluid part, so that a constant separation exists between core element and lid element, on the one hand, and the fluid part disposed on the underside, on the other hand. As a result, in the case of medical applications of the valve according to the invention, for example, the core element and lid element do not have to be configured to be sterile, for example, or in the case of switching of critical media, contamination of these aforementioned components of the valve according to the invention by the membrane is excluded.

In a further embodiment, the fluid part is releasably connected with the lid part, wherein this connection is made in simple manner by means of screws disposed distributed around the media chamber of the fluid part, which screws are screwed into corresponding threaded holes of the core element, so that this connection is configured in releasable manner, for replacement of individual elements.

For additional security to prevent exiting of the media that are valve-switched according to the invention, the fluid part can also be provided, on the top side, in other words in the region of its top edge, facing the core element, with a circumferential sealing lip, for complete sealing of the membrane with regard to the fluid part, wherein in this connection, it can also be practical that the core element itself is also provided with a circumferential sealing lip on the underside, which lip complements the other lip to provide a complete seal of this connection region.

In an alternative embodiment, the fluid part can also be connected with the core element with the interposition of a sealing element, instead of a fixedly installed sealing lip, which element is disposed above the membrane in the installed position, forming a seal.

In connection with the valve according to the invention, it has proven itself if the said sealing elements are produced from an elastic material and/or the membrane provided for switching of the media flow between core element and fluid element is produced from an elastic material, wherein the materials polydimethylsiloxane (PDMS) and ethylene-propylene diene monomer (EPDM) rubber have proven to be particularly suitable, in particular in connection with medical applications.

In a further concrete implementation of the object of the invention, the sealing element is structured in such a manner that it is produced from an expandable material such as an elastomer (e.g. PDMS, EPDM).

In this regard, the sealing element can comprise a central sealing disk, which is attached to crosspieces that are disposed spaced apart from one another and project inward from a circumferential frame or an inner circumferential structure of the sealing element, so that the sealing disk can be moved, under the effect of the valve ball or the valve plunger that can be moved by means of the actuator, in the direction toward the fluid part or away from it, in such a manner that the through-flow of the medium to be switched is interrupted or released by the fluid part, wherein for this purpose, the elastic crosspieces are stretched, if necessary, to suspend the sealing disk, or automatically shorten on their own, in such a manner that the sealing disk is moved back into its starting position.

The sealing disk reinforces the membrane by way of the valve seat, and thereby in fact forms an intermediate plunger. This intermediate plunger in turn ensures a more uniform distribution of the actuator force that is in effect, over the valve seat, and makes the valve less susceptible to failure in the event of slight displacements of the valve ball out of the center axis of the guide channel.

In a further improved embodiment, the actuator disposed above the core element and below the lid element is pressed in with the interposition of an equalization element between actuator and lid element, which is also produced from an elastic material, wherein core element and lid are screwed to one another with the interposition of the said equalization element. In this regard, the actuator lies directly on the conductor tracks of the core element, i.e. the electrical contact is produced by means of pressing the actuator against the conductor tracks of the core element, wherein the equalization element fulfills the function of a flexible clamping mat, which in turn is also produced from an elastomer and thereby ensures uniform force distribution and equalization of any uneven regions.

In yet another advantageous further development, the conductor tracks disposed on the top side of the core element can be coated with gold or another material that has good conductivity and also does not oxidize, in the interests of improved contact resistance.

In order to guarantee a particularly small-scale structure of the valve, the actuator itself is also produced from a flat material. The actuator is structured so that a variable arrangement of actuator crosspieces is suspended between two contact surfaces, which can be held together by an outer frame, in stabilizing manner. The actuator, in its totality, is produced from an SMA, with a flat geometry (film, foil, panel, band) and, as has been mentioned, is accommodated within the lid element so that electricity can be applied to it. With the different arrangements of actuator crosspieces, the valve according to the invention can be adapted, taking into consideration the respective field and purpose of use, in simple manner, in that arrangements of the actuator crosspieces adapted to the respective purpose of use are provided within the frame, in each instance. In particular, it is possible (while keeping the thickness of the SMA the same) to increase the power of the actuator and thereby the switchable pressure range of the valve, by increasing the number and/or the respective width of the actuator crosspieces.

In concrete terms, flat actuators structured in different ways can therefore be used for different applications. In this regard, the remaining structure of the valve, as well as the embodiment of some or all of the components, with the exception of the actuator, can be maintained, i.e. the valve can be adapted to the respective application by replacement of the actuator element.

In this regard, the actuator element and the equalization element are attached, while lying against one another between lid element and core element, in such a manner that the equalization element covers a defined contact surface of the actuator, but at the same time has recesses that allow free movement of the actuator crosspieces.

As has already been mentioned, the core element is provided, on its top side facing the actuator element, with at least two conductor tracks that are separated from one another and preferably consist of copper and/or with a surface finish composed of gold, nickel, silver or other materials that have good conductivity, and thereby allows electrical contacting or an electrically conductive connection with the actuator, wherein the core element is connected with a controllable or regulatable electricity feed by way of two connection poles disposed outside of the valve. The core element itself can consist of an electrically conductive material. In this case, an electrically insulating intermediate layer, which does, however, have good heat conductivity, as far as possible, and is thin, must be provided between the actual core and the superficial conductor tracks.

In a further improvement, the actuator crosspiece are dimensioned so that their length is at least approximately the same, in other words from one contact surface to another, and the conductor width is as uniform as possible. In this way, a uniform flow of electricity through all the crosspieces of the actuator is guaranteed. Furthermore, it has proven itself to dispose the electrical contact surfaces and their feed lines on the top side of the core element, in such a manner that a flow of electricity through the SMA actuator takes place as symmetrically as possible.

In a concrete embodiment, this reset element is implemented in the form of a helical spring, which is disposed around an adjustment screw screwed into the core element, so that the reset force of the helical spring can be adjusted by means of this adjustment screw.

To state it differently, the closing force of the valve can therefore be increased or reduced, i.e. adapted to the concrete requirements, by means of adjusting this adjustment screw.

As has already been mentioned, a further adaptation to the respective demands made on the valve is made possible in that the actuator crosspieces of the actuator are each structured with a flat construction, but can possess different geometrical embodiments, spatial forms, geometrical shapes. The simplest form of arrangement is a crosswise or star-shaped arrangement of straight actuator crosspieces. It is also conceivable, however, to arrange the actuator crosspieces in spiral shape, kirigami shape, meander shape or as bending beams, as a function of the respective requirement on location.

In a further embodiment of these adaptation possibilities of the actuator crosspieces, it is also conceivable to provide actuator crosspieces that not only experience a one-dimensional movement, in other words shortening or lengthening, as the result of the application of electricity, but rather also perform a movement in a second dimension, in other words, for example, in the form of bending upward or downward. Finally, it is also conceivable, within the scope of the invention, to integrate two or more valve seats into a valve, and to switch the actuators assigned to them electrically in series, in that the core element and the fluid part disposed below the core element have at least two valve seats spanned by the membrane assigned to them, to which seats at least one valve ball or at least one valve plunger is then assigned, in each instance.

Accordingly, multiple actuator units and multiple valve seats assigned to them, in each instance, can be combined in a single valve according to the invention; consequently, multiple media, even different media, can also be switched in a single component using the valve according to the invention.

For this purpose, it is practical, depending on the application, to switch multiple actuator units in the valve parallel to one another or in series, wherein these units can be controlled jointly or individually.

In an advantageous further development of this embodiment of the invention, a common electrode is assigned to all the actuator elements disposed within such a valve, so that in the case of actuators that can be controlled independently of one another, n+1 connectors are required. In this connection, it had proven itself to combine multiple actuator elements in a line arrangement, matrix arrangement, star arrangement or some other arrangement, in a single valve. In yet another further development, further electronic components such as batteries, capacitors, transistors, as well as further electro-technical control or regulation units can be assigned to such a valve, which items or units are also built into the valve according to the invention. For this purpose, affixation of the electronic components advantageously takes place directly onto the core element (e.g. around the SMA actuator), which is structured with suitable electrical conductor tracks and contact surfaces.

BRIEF DESCRIPTION OF THE DRAWINGS

The invention will be explained in greater detail below, using an exemplary embodiment that is shown only as an example.

The figures show:

FIGS. 3A-3G show different embodiments of the core element used in the valve, as well as different arrangements for valves having two or more actuator elements in a line arrangement, matrix arrangement or other arrangement;

FIGS. 4A-4J show different embodiments of the actuators used in this valve;

DETAILED DESCRIPTION OF PREFERRED EMBODIMENTS

Figure 1:
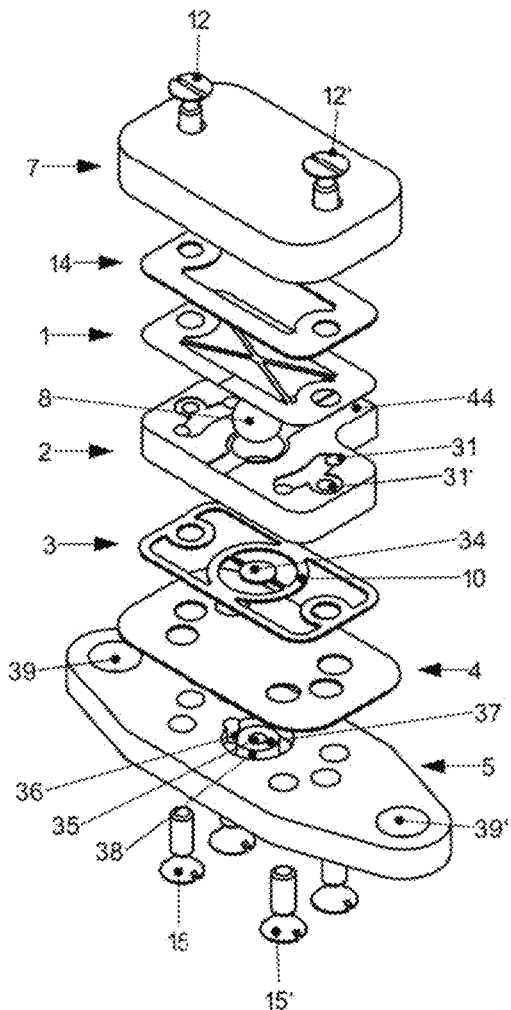
FIG. 1 shows a valve in the normally open embodiment, in an exploded view.

FIG. 1 shows, in a perspective view, the structure of a valve for switching of media, preferably liquids or gases, with an actuator 1 in a flat form, which is produced from a shape memory alloy, SMA for short. The action principle of this actuator 1 is assumed to be known.

In this regard, FIG. 1 shows a normally closed valve. Essentially, the valve consists of a core element 2, which is encompassed from above, on the top side, by a lid element 7, and is encompassed from below, on the underside, by what is called a fluid part 5.

In this regard, the lid element 7 is screwed onto the core element 2 by way of multiple connection screws 12, 12'.

In detail, the lid element 7 is screwed onto the core element 2 with the interposition of an equalization element in the form of an actuator mat 14 composed of a flexible material, preferably an elastomer, as well as the actuator 1 itself, as well as a valve ball 8.

On the underside, the core element 2 is encompassed from below by the fluid part 5 that has already been mentioned, which in turn is connected, by way of further connection screws 15, 15', with the core element 2, with the interposition of a media-tight membrane 4, as well as a flat spacer disposed above this membrane 4 in the installed position, which spacer is delimited by a clamping ring 40 on the outside.

In this regard, the fluid part 2 and the membrane 4 form a unit, through which the medium to be switched is passed in the open state. In this regard, this unit is produced not by means of gluing but rather solely by means of clamping and/or a screw connection. Accordingly, these two components are also the only ones that come into contact with the medium to be switched. In a concrete embodiment, the fluid part 2 has a media inflow 35, which opens into a valve seat 37 within a media chamber 38, as well as a media outflow 36, through which the medium flows out of the chamber 38. The aforementioned media chamber 38 is closed off, on the top side, by the membrane 4, which is fixed in place in its intended position by means of clamping between the top side of the fluid part 5 and the underside of the core element 2. The clamping is brought about by the connection screws 15, 15', which are disposed around the media chamber 38. In the present example, these are four such connection screws, which are screwed into corresponding threaded through-holes 31, 31' of the core element 2. For attachment of the valve on a fluidic plate by means of a screw connection, the fluid part contains at least two attachment holes 39, 39'.

For improvement or complete sealing of the fluid part 5 relative to the core element 2, the fluid part 2, on the top side, and/or the core element 2, on the underside, is provided with a sealing lip, in each instance, which is not shown in any detail in the drawing. Alternatively, in addition, a sealing element 3 can also be disposed between core element 2 and membrane 4, optionally also between membrane 4 and fluid part 5.

It is understood, in this regard, that both the membrane 4 and the sealing element 3 are each produced from a media-tight, preferably elastic material. Here, in particular, production from an elastomer, for example from PDMS or EPDM, has proven itself. The aforementioned sealing element 3 can optionally be configured in such a manner that it is provided with a sealing disk 34 held on thin crosspieces, in each instance, which disk is disposed above the valve seat and thereby brings about a more uniform distribution of the closing force introduced by the actuator 1 during closing of the valve. The aforementioned actuator 1, as has been mentioned, is laid in between the core element 2 and the lid element 7, and is also firmly connected with the core element 2, also by way of a conventional screw connection, by means of the screws 12, 12'. In this regard, the screws 12, 12' are passed through suitable through-holes 28, 28' in the contact surfaces 27, 27' of the actuator 1, so as to optimally distribute the press-down force over the contact surfaces 27, 27' (See, e.g., FIG. 4A). In this regard, according to FIG. 1, an equalization element in the form of what is called an actuator mat 14, which fulfills the function of an equalization element, is laid in between the actuator 1 and the lid element 7, wherein this actuator mat 14 is also produced from an elastic material. This actuator mat 14 partially covers the contact surfaces of the actuator 1, but leaves suitable recesses free, as intended, so as to guarantee free mobility of the actuator crosspieces 26, 26', which are configured crosswise in the present case. See FIG. 4B.

In this regard, the core element 2, in connection with the actuator 1, represents the functional component of the valve. The core element 2, the embodiment of which is shown in FIG. 3A, is essentially produced from a mechanically rigid and thermally well-conductive material 50, and fulfills multiple functions within the valve at the same time. For one thing, the core element 2 contains the through-holes 31, 31' which are provided with a thread, for mechanical attachment of the components connected with the core part, in other words, in particular the lid element 7 and the fluid part 5, but also of the membrane 4, the sealing element 3 and, above the core element, the actuator 1 and the actuator mat 14.

Furthermore, the core element 2 fulfills the function of a thermal sink for the electrically heated SMA actuator 1, which in turn is required to guarantee rapid resetting of the actuator in the event of interruption of the electricity supply (i.e. in the current-free normal state of the valve), wherein the function of the heat sink can also be supplemented and/or supported by means of the lid element 7, depending on the material used.

Finally, electrical contacting of the actuator 1 is ensured by way of the core element 2. For this purpose, the core element has at least two electrical conductor tracks 30, 30', separated from one another, which are provided with suitable contact interfaces 52, 52' for the contact surfaces 27, 27' of the actuator.

The conductor tracks 30 consist of an electrically well-conductive material or layer 48, typically copper, and can have a surface finish so as to improve the electrical contact with the actuator 1 and to protect the actuator against oxidation and other chemical influences. In the event that the core material 50 is also electrically conductive, an electrically insulating intermediate layer 49 must be provided between the core material 50 and the conductor track layer 48.

Finally, the core element 2 has further contact surfaces or electrical conductors 44, 44', which can optionally be structured as crosspieces, pins or other connectors or be connected with such, so as to connect an external power supply for the actuator 1 to the core element 2.

Furthermore, the core element fulfills the function of a guide element for precise guidance of the valve ball 8 or of the valve plunger relative to the valve seat 37. For this purpose, the core element 2 is provided with a passage opening or plunger guide 51, which allows precise guidance of the valve plunger or of the valve ball 8, wherein this guidance is provided with a sufficient tolerance so as to guarantee low-friction movement of the valve elements indicated above through the guide, with reference to the valve seat 37 disposed below the core element 2. In order to guarantee uniform transfer of force, the passage opening of the core element 2 is disposed centered with reference to the crosspieces 26, 26' of the actuator 1.

In the constructed valve in the normally open embodiment, the crosspieces 26, 26' of the actuator 1 are deflected upward, away from the core element 2, i.e. out of the plane of the flat-form actuator, by the valve ball 8. In order to permit such deflection, the lid element 7 contains a pocket, not shown in any detail here, on its underside. When electricity is applied, the actuator crosspieces 26, 26' pull back into the plane of the flat-form actuator and counteract the valve ball 8.

Figure 2:
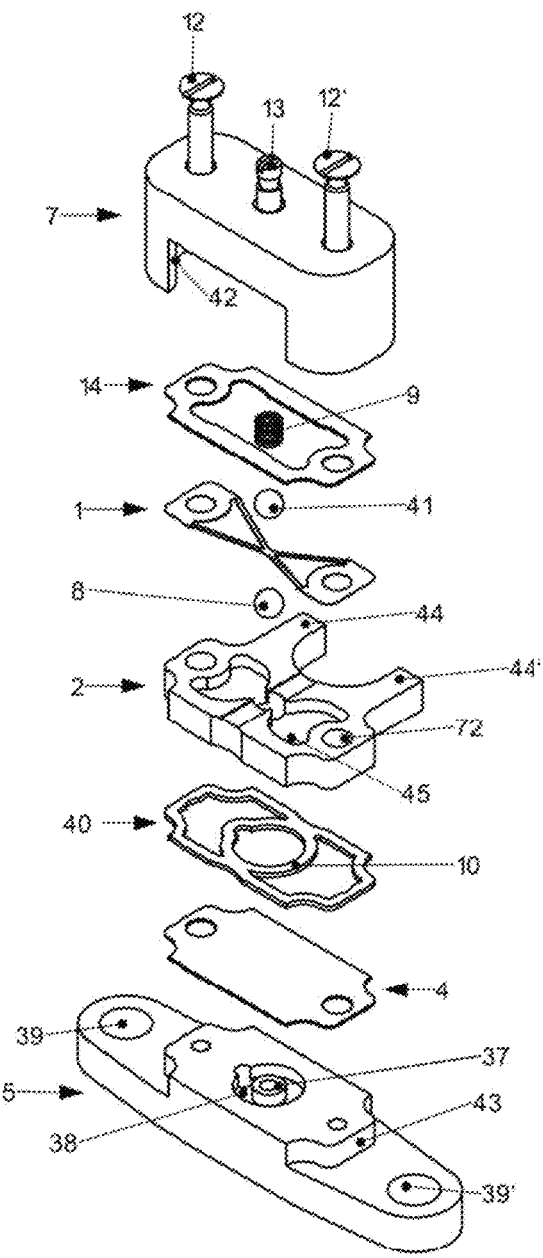
FIG. 2 shows a valve in the normally closed embodiment, in an exploded view.

An embodiment variant of the valve with normally closed functionality is shown in FIG. 2, in a perspective representation. The precise embodiment of the core element is additionally shown in an enlargement in FIG. 3B. The normally closed valve differs from the normally open valve in that it additionally contains a reset element 9, against which the actuator 1 acts in the state in which electricity is applied. For this purpose, the crosspieces 26, 26' of the actuator are deflected downward in the direction of the valve seat, in other words into the core element, in the state when no electricity is applied, by the reset element 9. In order to permit such deflection, the core element 2 contains suitable pockets 45 for a normally closed valve.

As has already been described above for the normally open valve, a valve ball 8 guided in a plunger guide 51 of the core element 2 transfers the force of the actuator 1 (and also of the reset element 9, if applicable) to the membrane 4, and this membrane in turn transfers it to the valve seat 37. As soon as a flow of electricity takes place through the actuator 1, the actuator pulls back into its flat form and thereby relieves stress on the valve ball 8 caused by the force of the reset element 9.

In a simple embodiment (not shown here), the reset element 9 can be laid into a pocket in the lid element, not shown in any detail here. In this case, the bias of the reset element is predetermined and fixed by means of the height of the reset element in the unstressed state as well as by the depth of the pocket.

In an advantageous embodiment, the valve can alternatively be structured in such a manner that the bias of the reset force can be changed and can be adapted to the respective application. For this purpose, the reset element 9 is guided, in the form of a helical spring between the actuator 1 and a biasing element 13, e.g. structured as a headless screw, in a suitable opening in the lid element, which opening contains a thread at least at the upper end. By means of screwing the biasing element 13 in or unscrewing it, the reset element 9 can thereby be compressed or relieved of stress.

In order not to transfer the torsion forces of a rotational movement when adjusting the biasing element to the actuator 1, and thereby risking damage to it, an additional equalization ball 41 can be introduced between reset element 9 and actuator 1.

The embodiment of the valve shown in FIG. 2 differs from the representation in FIG. 1 by the following details, which should be considered optional, i.e. any desired combinations of the embodiment variants from FIGS. 1 and 2 are conceivable.

Instead of screwing the fluid part 5 and the lid element 7, as described above, onto the core element 2 separately, in each instance, the lid element 7 is screwed onto the fluid part 5 directly, by way of suitable through-holes and threaded bores, and all further components are thereby clamped in place between these two. For this purpose, the core part 2 contains thread-free through-holes 72, 72' (see FIG. 3B) instead of threaded holes or bores 31, 31'. The advantage of this variant is that the number of required connection screws 12, 12' is reduced to two (i.e. the additional screws 15, 15' . . . are eliminated). The disadvantage is that the fluid part 5 and the lid element 7 can no longer be removed or replaced separately from one another (e.g. for maintenance, repair, cleaning).

As a further alternative solution, a clamping ring 40 (see FIG. 8) made of rigid material is used for sealing the membrane 4 on the fluid part 5, instead of a sealing element 3 made of elastic material. This ring is laid in between membrane 4 and core element 2, and contains a circumferential sealing lip 10.

In the embodiment variants shown in FIG. 1 and FIG. 2, media inflow 35 as well as media outflow 36 open up on the underside of the valve. For certain applications (e.g. filling/venting a chamber with a valve in the outer wall), however, it can make sense to place inflow and outflow on opposite sides.

Figure 7:
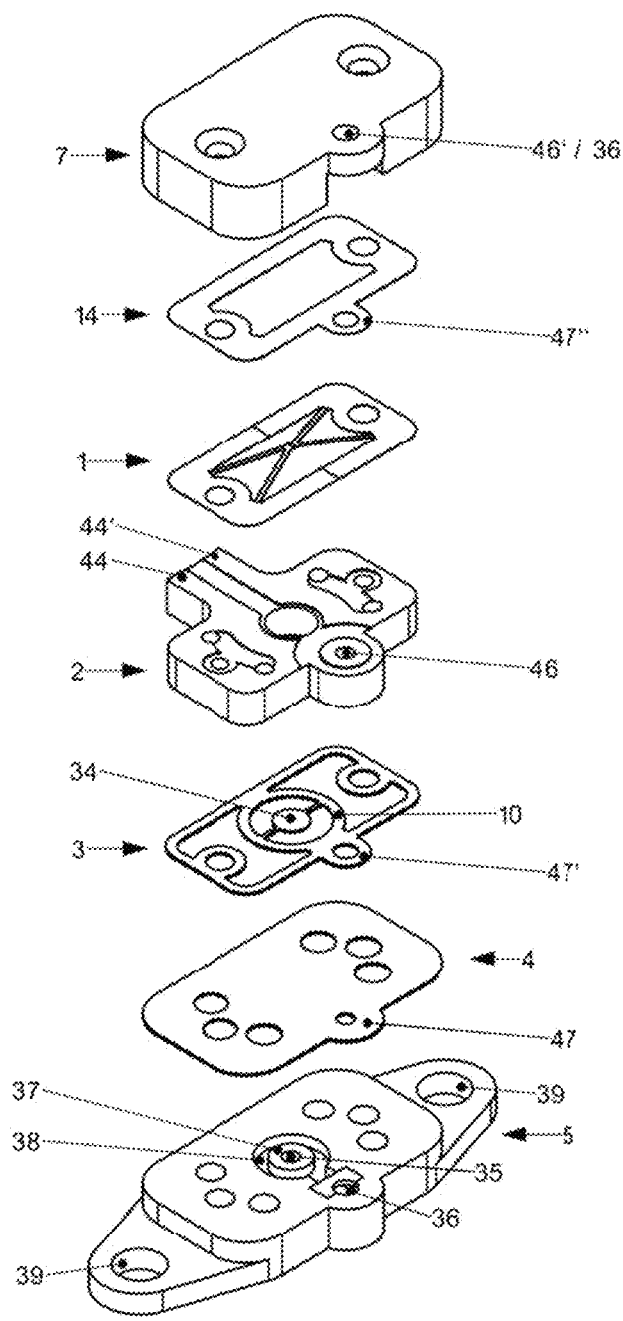
FIG. 7 shows a variant of the normally open valve with media inflow and outflow on opposite sides.

An embodiment of a corresponding valve is shown in FIG. 7. In this case, the media outflow is not guided downward as a channel through the fluid part 5, but rather is deflected upward, wherein core element 2 and lid element 7 each contain a channel opening 46, 46'. The subsequent elastomer elements membrane 4, sealing element 3, as well as the equalization element 14, each contain a passage opening at the corresponding location, and serve as a sealing ring 47, 47', 47" for the channel 46.

The individual valve components explained above are structured in such a manner that they automatically align themselves during assembly, so that incorrect assembly is practically excluded due to the formation of the individual valve components. The precise orientation of the individual components, in particular between actuator 1 and core element 2, as well as between the passage opening 51 that acts as a plunger guide and the valve seat 37 of the fluid part, which is disposed below the pass-through, which seat closes off the media inflow 35 in the closed state, serves to absolutely guarantee trouble-free function of the valve 1.

The correct orientation of the individual parts can be guaranteed, in this regard, by means of known centered pins, screws or other structures within the valve, but also by suitable shaping of the outer walls of the lid element 7 and/or of the fluid part 5.

As an exemplary embodiment, a lid element 7 having an underside collar 42 is shown in FIG. 2, which collar is oriented precisely based on the top-side step 43 of the fluid part 5, and furthermore also aligns all the stacked components that lie in between.

The precise orientation of the individual components of the valve simultaneously represents additional protection against environmental influences, so that penetration of liquids or contamination of the valve, for example, is excluded, to a great extent, as a result.

FIGS. 4A-4J show different embodiment variants of the actuator 1. In this regard, the actuator 1, as has already been mentioned, is produced from a shape memory alloy such as from NiTi or from NiTiCu, in a flat form, for example, which alloy has the desired shape memory effect, as a function of the expected use temperature, in each instance, optionally also the two-way shape memory effect that has been imposed, if applicable. In each instance, a flat material is used as a semi-finished product, wherein this material can optionally be rolled foils, strips, flat wires, strips obtained by means of melt spinning or sputtered films. The use of such flat materials has the advantage, first of all, that in comparison to the volume used, they possess a large surface area, in comparison with round wires having the same cross-sectional surface, which are also used as actuator material. This large surface area in turn has the advantage of allowing more rapid transfer of heat to the surroundings, and thereby faster resetting of the actuator used takes place after interruption of the feed of electricity. The valve accordingly possesses shorter switching times.

The actuator elements shown in FIG. 2 have in common that they each possess at least two contact surfaces 27, 27', which simultaneously serve for mechanical attachment and for electrical connection, wherein these contact surfaces are connected with one another by way of at least one crosspiece 26, in accordance with FIG. 4A. In the installation position, the contact surfaces are permanently attached, and the crosspieces or the crosspiece 26, in the state of not having electricity applied, are deflected out of the plane in the direction of the valve ball 8 or valve plunger, which cannot be seen in this representation, or, alternatively, in the opposite direction, depending on whether the valve is a normally closed or normally open valve. In the case of the flat geometry of the crosspiece 26 that is being aimed at, this geometry results at least approximately completely in pure tensile stress along the inserted crosspiece 26 (in spite of the deflection out of the plane).

In improved embodiments, as shown in FIGS. 4B-4D, the actuator 1 is fitted out not with one but rather with multiple crosspieces 26, 26', which intersect in the center, in each instance, in accordance with FIGS. 4B-4F. This arrangement brings about increased stability of the actuator element 1, in relation to the valve ball 8, or to the valve plunger, not shown here. In accordance with the embodiments according to FIGS. 4A-4D and 4F, the contact surfaces 27, 27' are each provided with a through-hole 28, 28', which allows a screw, a rivet, a centered pin or some other structure for alignment and attachment of the actuator 1 to be passed through. Furthermore, the actuator 1 can be provided with a central through-hole or orientation hole 53 in the center of the actuator crosspiece 26, which hole serves for alignment and/or attachment of a valve plunger.

In the case of embodiments of the valve that are suitable for switching larger media flows, for example, it is necessary to use actuators 1 that possess a greater setting path than what an actuator 1 having straight-line crosspieces 26 according to FIGS. 4A-4F can make available, within the limited construction space, against the background that valves having the smallest base area possible are desired.

Figure 4I:
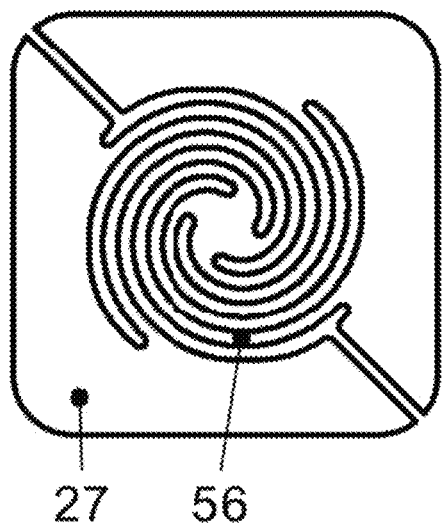

For this reason, the effective actuator length can be increased, while keeping the base surface of the actuator 1 the same, in that the crosspieces are structured as meander crosspieces 55 in accordance with FIG. 4H, using a kirigami structure 54 in accordance with FIG. 4G, or as spiral arms 56 in accordance with FIG. 4I. Here, a kirigami structure is understood to mean (by analogy to the Japanese art of kirigami) that the two-dimensional surface of an SMA actuator composed of a flat semi-finished product is divided into one or more conductor tracks 54 having an approximately constant cross-section, which connect the contact surfaces 27, by making suitable cuts, wherein the material loss caused by the cuts is kept as low as possible. In these embodiments, not only is an (approximately) pure tensile force transferred by way of these crosspieces 55, but also bending forces and torsion forces are transferred.

In this regard, the crosspieces 26, 54, 55 and 56 are structured in such a manner that they produce an electrical connection between the contact surfaces 27, 27', and, in this regard, have a uniform conductor cross-section, so as to guarantee uniform mechanical stress, connected with uniform inherent heating when electricity flows, of the actuator crosspieces 26, between the contact surfaces.

In order to prevent possible damage to the actuator elements during assembly and in use, the contact surfaces 27, 27' can additionally be connected by means of support crosspieces 29, which therefore, together with the contact surfaces 27, 27', form a circumferential frame. After assembly, these support crosspieces 29 must then be cut through before start-up of the actuator, because otherwise the control current would be conducted past the actuator crosspieces.

Both mechanical attachment and electrical contacting and thermal connection of the actuator take place by way of pressing of the actuator between the core element 2 and the lid element 7. In this regard, it has proven itself if what is called an actuator mat 14, which is also produced from an elastic material, is laid in between lid element 7 and actuator 1 as an equalization element.

To supply electricity to the actuator 1, the core element 2 according to FIGS. 3A-3G is provided, on the top side, with at least two conductor tracks 30, separated from one another, made from a material having good conductivity, which tracks stand in electrically conductive connection with two poles of an external electricity feed 68 (see FIG. 10), in suitable manner, by way of the contact surfaces 44, 44'. In the simplest embodiment, a conductive surface coating 48 of the core element 2 is divided into two partial surfaces by means of a continuous interruption, namely into the conductor tracks 30, 30'. In an advantageous further development, the conductor tracks 30, 30' can be designed in such a manner that the path through all the crosspieces 26, 26', from contact surface 27 to contact surface 27', is at least essentially of the same length, wherein the contact surfaces 27, 27' of the actuator 1 lie precisely on the contact surfaces 52, 52' of the core element 2, in each instance, so that a uniform flow of electricity through all the crosspieces 26 is ensured. Furthermore, the conductor tracks 30, 30' on the core part 2 represent the interface of the actuator 1 with an external supply of electricity and therefore end in suitable connection or contact surfaces 44, 44', in each instance.

Figure 4J:
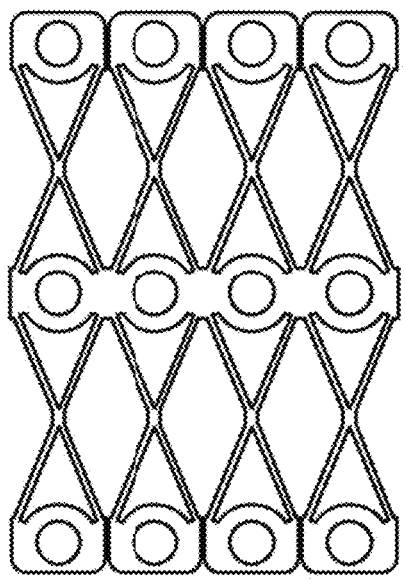
Figure 5A:
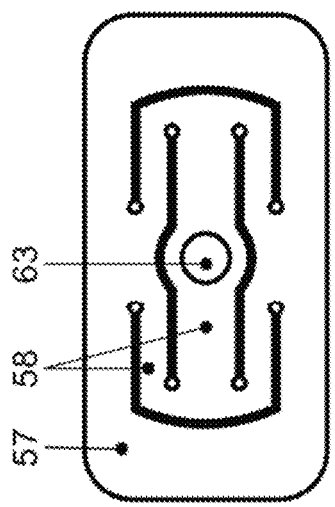
FIGS. 5A-5I show different embodiments of flat-form springs for use in normally closed valves.
Figure 5B:
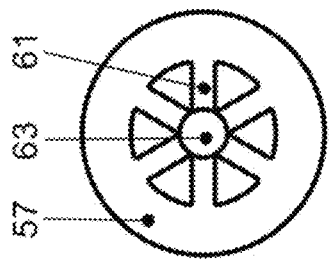
Figure 5C:
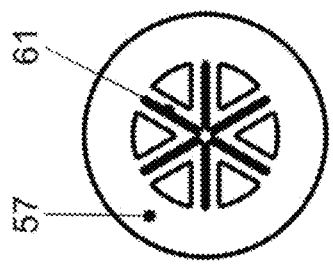
Figure 5F:
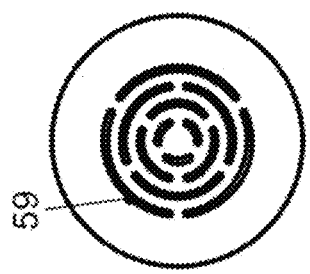
Figure 5E:
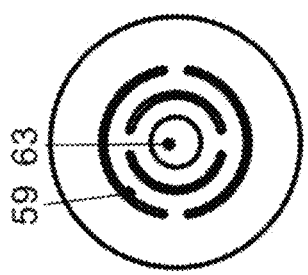
Figure 5D:
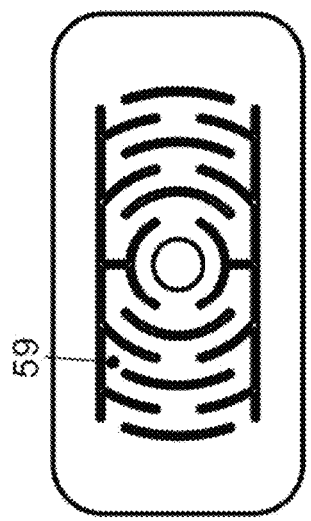
Figure 5I:
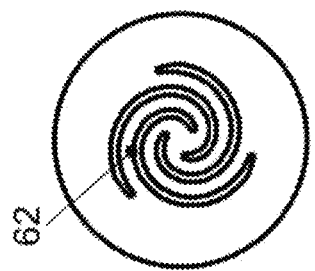
Figure 5H:
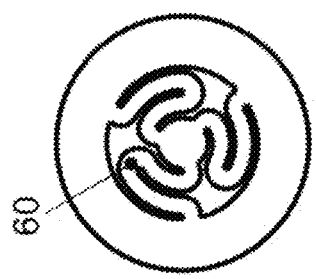
Figure 5G:
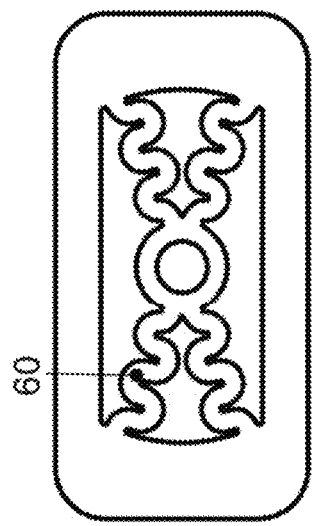

As will still become clear below, multi-way or multi-functional valve variants can also be implemented within the scope of the invention, in such a manner that multiple actuator units 1 are combined in a single component. In this regard, it is advantageous if these variants can be implemented by means of a single common core element 2. In this connection, the individual actuator units 1 can be connected with one another in a parallel circuit in accordance with FIG. 3F, serial circuit in accordance with FIG. 3E or some other circuit, or can also be controlled individually. In this connection, it makes sense to combine at least one contact surface 27 of each actuator 1 to form a common electrode, so that in the case of N actuator units that can be controlled independent of one another, only n+1 external electricity feeds 44, 44' are needed instead of 2× n electricity feeds. In this regard, material and construction space can be saved in that multiple actuators 1 are combined in a line arrangement, matrix arrangement, star arrangement or some other arrangement, to form a single component having at least one divided contact surface 27, as shown in FIG. 3G and FIG. 4J as an example.

In this connection, FIG. 3D shows a valve structure having two actuators switched in series, as it can be used for a 3/2-way variant of a valve, for example, wherein FIG. 3D shows the two actuators 1, 1' switched in series in a perspective top view, with the core element 2 disposed underneath.

Figure 8:
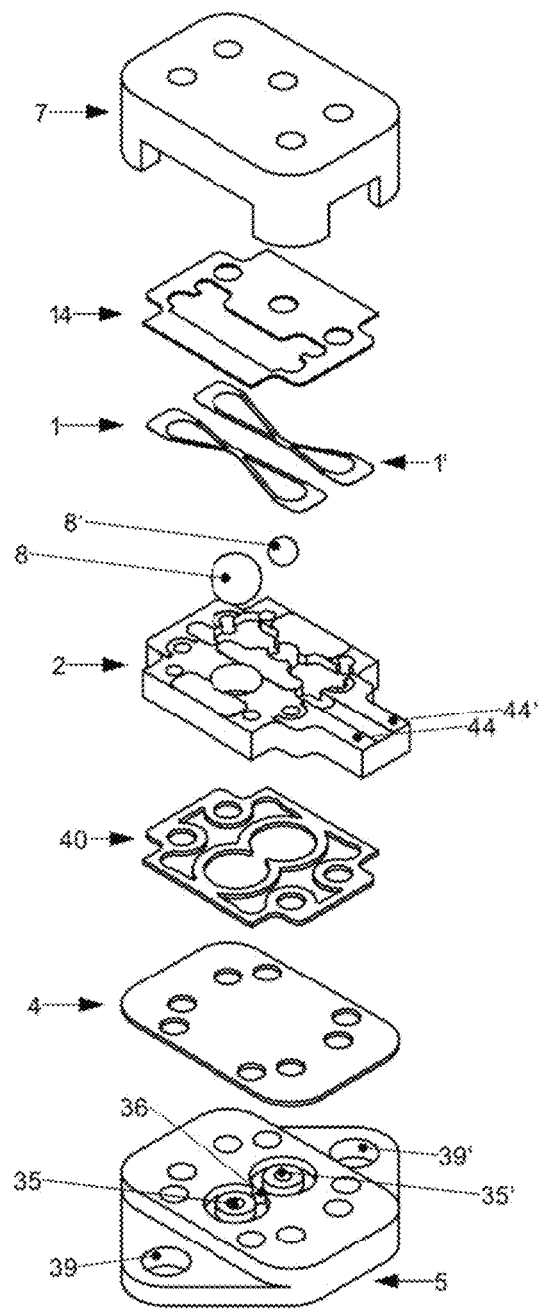
FIG. 8 shows a 3/2-way variant with two actuator elements switched in series, in an exploded view.

The overall structure of such a valve is shown in an embodiment of a 3/2-way valve in FIG. 8.

In this regard, the basic structure is as described above, in other words a lid element 7 encompasses the core element 2 from above, with the interposition of an actuator mat 14 and two actuators 1, 1'; the element in turn is encompassed from below by the fluid part 5, with the interposition of membrane 4 and sealing element or clamping ring 40.

The particularity of this valve now consists in that multiple valve seats 37, 37' (see FIG. 11) and multiple actuator units 1, 1' are integrated into the valve, and furthermore also the fluid part 5 has two media inflows 35, 35', which open into a separate media chamber 38 in each instance, to which chamber a separate valve seat is also assigned. The two media chambers 38 are connected by means of a horizontal channel, in the center of which a common media outflow 36 is disposed.

In this regard, the media chambers 38 are sealed off by means of the membrane 4. Accordingly, the core element 2 is provided with two separate passage openings/ball or plunger guides 51, 51' for the valve balls 8, 8' or valve plungers.

Actuators 1, 1', shown in detail in FIGS. 4A-4J, are disposed on the core element 2. Accordingly, the valve is suitable for use as a shuttle valve, wherein for this purpose, one of the actuators 1 or 1' is designed for a normally closed valve variant and therefore is provided with a reset element, in a manner not shown in any detail, while the other actuator 1' or 1 is designed for a normally open valve variant.

Accordingly, only one of the media inflows 35 or 35' is connected with the outlet when both actuators are without current. As soon as both actuators 1, 1' have electricity applied to them, this media inflow 35 or 35' is sealed off by means of the membrane 4, and the respective other media inflow 35 or 35' is open. Such a valve can be used as a shuttle valve. In this case, it is advantageous to switch the actuators 1, 1' electrically in series and, for this purpose, to connect one of the contact surfaces 52' of each actuator by means of a conductor track 30, and to connect the respective other contact surface 52 with the external electricity supply by way of the contact 44, 44'. (See FIGS. 3C, 3D, and 3E). As a result, both actuators 1, 1' are always activated or deactivated at the same time. The shuttle valve function results from the fact that one valve seat is structured to be normally open, and the other is structured to be normally closed.

In an alternative embodiment in accordance with FIG. 3F, the conductor track 30 is connected with an additional electrical connector 65, which serves as a common ground or mass electrode. In this manner, each actuator 1, 1' can be separately supplied with a control current. If electricity is applied to only one of the actuators 1 or 1' at the same time, both media inflows 35, 35' can therefore be opened or closed at the same time. Such a valve is suitable as a proportional mixing valve for metering, regulation and distribution of media such as liquids or gases.

In this regard, it also conceivable, within the scope of the invention, that more complex tasks are possible, for example in connection with medication mixers, biological cell culture systems or in connection with the use of vacuum suction plates, by combining any desired number of valves in a line arrangement or matrix arrangement (see FIG. 3G) to form a single component, in other words in a valve system.

Figure 9:
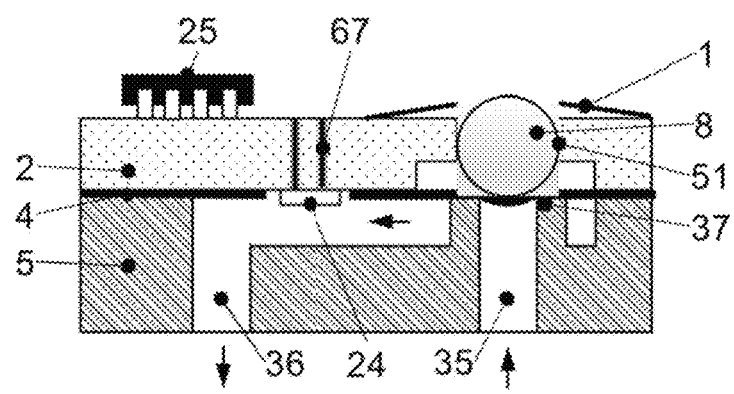
FIG. 9 is a sectional view of the core element of the valve in an embodiment with additional components.

In accordance with FIG. 9, not only can multiple actuator elements be integrated into a valve arrangement according to the invention, but also further electronic components can as well. These further electronic components may be batteries or capacitors for storing a charge, transistors for implementation of circuit logics, pre-resistors for adaptation of current/voltage or as overload protection, sensors for monitoring valve functionality and the medium to be switched, in each instance, for example with regard to its temperature, pH, through-flow, viscosity, etc. The particularity in distinction from the state of the art is that affixation can take place directly onto the core element 2 in the interior of the valve, instead of on an external circuit board. Thereby no further electrical connections are required next to the conductor tracks on the core element, so that the number of electrical interfaces is kept as low as possible. In this regard, integration of micro-controllers 25 for control, for example within the scope of pulse-width modulation and for regulation of the valve, directly on the core element, is conceivable, and these micro-controllers are then also disposed in the valve housing.

In this regard, these additional electronic components can be disposed on both sides (i.e. top side and underside) of the core element 2, wherein these components are then connected with one another by means of corresponding through-contacts 67 ("vias"), which are passed through the core element 2, and connected with the electricity supply or electrical circuits. This arrangement allows a particularly compact embodiment of the valve, which can be required, for example, in mobile field devices, implantable devices or in point-of-care diagnostics.

In this exemplary embodiment, a calorimetric through-flow sensor 24, which is connected on the underside of the core element 2 and passed through a suitable opening in the membrane 4 in the channel of the media outlet 36, has electricity applied to it and is read out. On the top side, a micro-controller 25 is connected with conductor tracks on the core element 2. The media inflow 35 is switched by way of the valve ball 8, which is activated by way of the actuator 1. In this regard, the media flow is passed through the fluid part 5 in such a manner that the media stream is conducted past the through-flow sensor 24.

FIGS. 5A-5I, in different embodiment variants, shows two-dimensional reset spring structures, which are produced from a flat material. Fundamentally, the reset element 9, which presses the valve ball 8 or the valve plunger against the valve seat 37 in the current-free state of the actuator 1, in such a manner that the media inflow 35 is closed off by means of the membrane 4, can be structured in the form of a spring. In this regard, this spring should be designed in such a manner that on the one hand, it is able to close the valve counter to the pressure difference that exists at the inlet (media inflow 35) into the media chamber 38, but vice versa is also dimensioned in such a manner that this spring force can be overcome by the actuator 1 when electricity is applied to it, as soon as it deforms in the direction of its flat memory shape.

Aside from this fundamental dimensioning, embodiments are also conceivable, in which the reset force is set in such a manner that the valve opens starting from a defined critical difference pressure, and thereby the valve is provided with an over-pressure protection function.

Fundamentally, in this connection, any spring variant is suitable as a reset element. In accordance with FIGS. 5A-5I, the reset element 23 (see FIG. 6) is implemented as a flat, two-dimensional component.

In this regard, it is conceivable that this reset element 23 is produced from spring steel or from a suitable alloy, a suitable polymer or elastomer. The spring force of the reset element 23 is determined by the geometry selected (length, width, and number of spring arms or crosspieces 58), the thickness of the material selected, the material itself, as well as the pre-deflection of the flat-form spring and the respective two-dimensional geometry. FIGS. 5A-5I show different embodiment variants of this reset element 23. According to FIGS. 5A-5I, these variants can be reset elements 23 having a bending beam 61 in accordance with FIGS. 5B and 5C, a combination of multiple spring crosspieces 58 and bending beams in accordance with FIG. 5A, kirigami-type structures 59 in accordance with FIGS. 5D, 5E and 5F, as well as meander structures 60 in accordance with FIGS. 5G and 5H, or spiral arms 62 in accordance with FIG. 5I. The spring structures just described are encompassed by a frame 57, in each instance, which serves as a support surface for attachment in the valve by means of clamping. Optionally, the reset element 23 can have an orientation hole 63 in the center, which facilitates attachment or alignment of a valve plunger or a valve ball 8.

Figure 6:
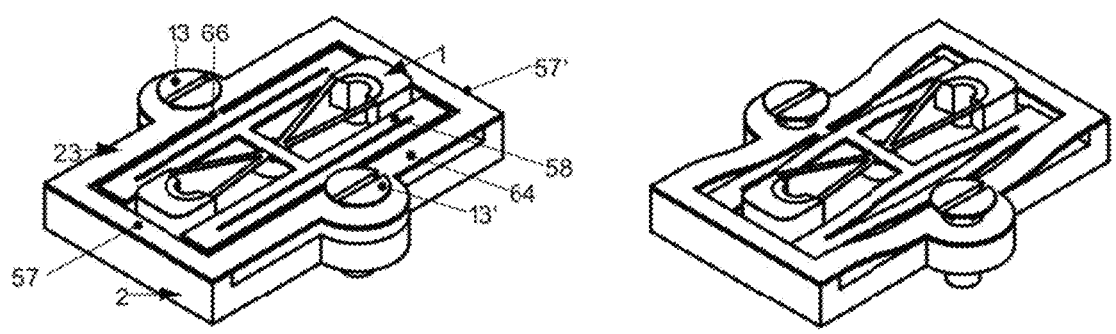
FIG. 6 shows an embodiment variant of a flat-form spring, with an adjustable spring bias.

A further concrete embodiment variant for such reset element 23 in the form of a reset spring, configured in two dimensions, which spring is produced from a flat material, is shown in FIG. 6. This embodiment has the advantage that the closing force of the reset element 23 can be adjusted subsequently, after its installation, i.e. reversibly.

Accordingly, the closing force can be subsequently adapted to the respective application, the pressure to be switched, and to the respective actuator element 1, i.e. the same reset element 23 can be used for different applications.

In this exemplary embodiment, the frame of the reset element 23, on two opposite sides 57, 57', lies on suitable contact surfaces of the core element 2, and two free-standing crosspieces or bias springs 64, which connect the parts or sides 57, 57' of the frame that were just mentioned, are guided in the core element 2 by way of a suitable pocket, and each contain a through-hole for a biasing element 13, 13' (in the form of an adjusting screw). By means of the arrangement described, the reference plane 66 of the reset element 23 can be changed with regard to the core element 2 by means of tightening of the biasing elements 13, 13', in that bending of the part of the frame structured as a bias spring 64 is adjusted, in other words the bias is adjusted by means of the vertical displacement of the reference plane 66 in the direction of the core element 2 that is brought about, in other words by means of the adjusting screws 13, 13'. As is also evident from FIG. 6, the actuator 1 is disposed within the frame, wherein this embodiment is, of course, not restricted to this special embodiment of the actuator 1.

Figure 10:
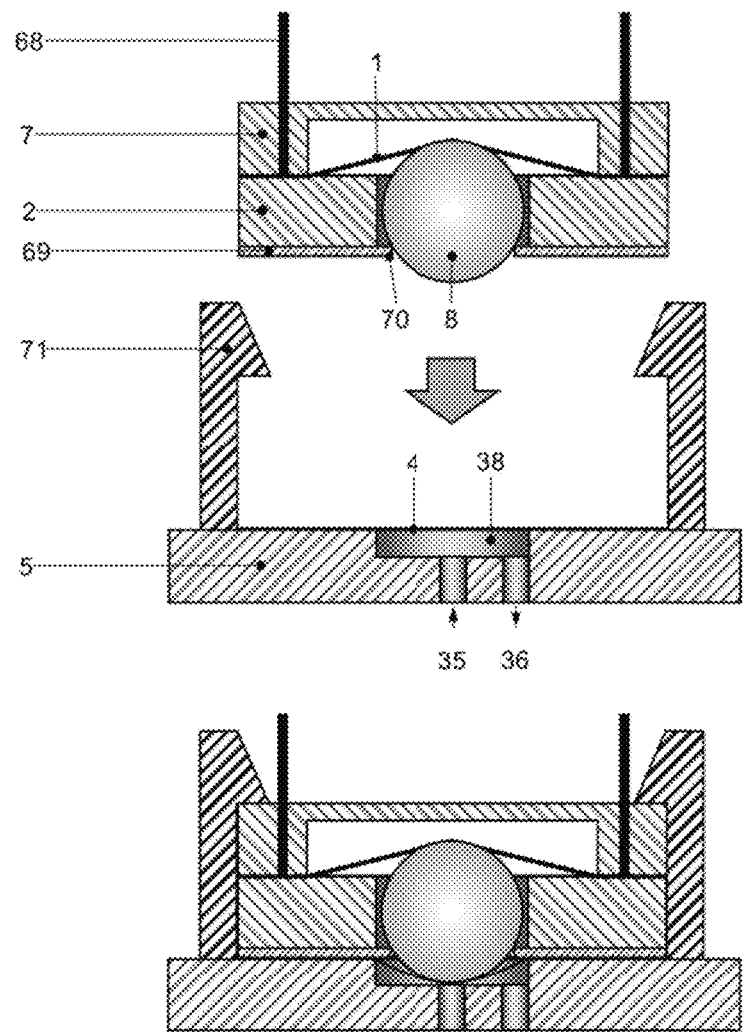
FIG. 10 shows a variant of the valve structure, with an interchangeable fluid part, in a sectional view.

In yet another advantageous further development, the object of the invention can be configured in such a manner that the fluid part 5 is interchangeable, in accordance with FIG. 10. In accordance with the representation in FIG. 10, in this regard the core element 2, with end plate 69 and plunger retainer collar 70, is inserted into a clamp fit 71 of the type such that the valve ball 8 encompassed from above by the actuator 1 is set onto the valve seat 37 in such a manner that the media inflow 35 can be switched by means of the valve ball 8, in such a manner that in the current-free state, the media inflow 35 is interrupted by the valve ball 8, with the interposition of the membrane 4, i.e. released in the state in which electricity is applied, so that the transfer of the medium to be switched, through the media chamber 38 into the media outflow 36, is opened. In other words, this drawing makes clear that only the fluid part 5 enters into connection with the medium to be switched, so that the core element 2 can also optionally be replaced, or can be used in connection with other media. Accordingly, the fluid part 5 and actuator element 1 can be replaced independent of one another.

Figure 11:
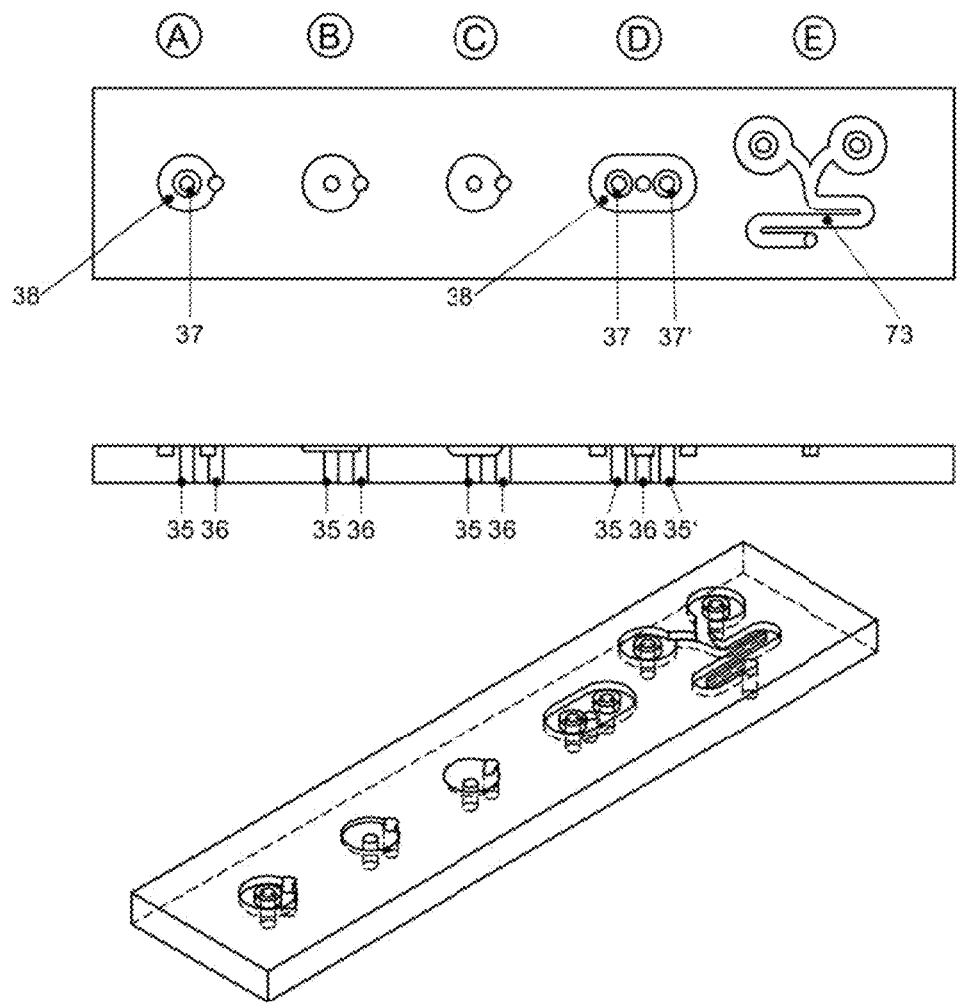
FIG. 11 shows different embodiment variants of the media chamber or multiple connected media chambers in a fluid part.

Different embodiments of the media chamber 38 of the fluid part 5 are shown in FIG. 11. In accordance with FIG. 11A, the valve seat 37 can be structured as a circumferential collar around the media inflow 35 within the media chamber 38. In accordance with FIG. 11B, alternatively, the valve seat can be formed by the bottom of the media chamber itself. This arrangement facilitates flushability/cleaning of the valve after use. A further improvement in flushability is achieved by means of rounding off or beveling the side walls of the media chamber, in accordance with FIG. 11C. For a multi-way valve, in accordance with FIG. 11D, multiple valve seats 37, 37' can be disposed in a common media chamber 38. In accordance with FIG. 11E, multiple separate media chambers 38, each having valve seats assigned to them, can be disposed next to one another and connected by way of an outflow channel 73 having a common media outflow 36. The outflow channel 73 can serve as a mixer for two or more media to be switched by the valve, if it is suitably structured.

The invention thus describes an actuator-operated valve having an extremely flat construction, which can be used in a great number of the most varied applications, and is characterized, in particular, in that it can be adapted to different applications in simple manner, in the sense of a modular set, because of its simple structure.

Although only a few embodiments of the present invention have been shown and described, it is to be understood that many changes and modifications may be made thereunto without departing from the spirit and scope of the invention.

What is claimed is:

1. A valve for switching of media comprising:
   (a) at least one actuator comprising a shape memory alloy having a flat memory shape and at least first and second electrical contact surfaces and an arrangement of actuator crosspieces located between and connecting the first and second electrical contact surfaces in a conductive manner, wherein the arrangement of the at least one actuator is selected from the group consisting of a crosswise arrangement, a star shape arrangement, a spiral shape arrangement, a kirigami shape arrangement, a meander shape arrangement, and an arrangement of bending beams and are deflected out of a plane to a greater extent in a current-free state than in an electricity-supplied state, wherein the first and second electrical contact surfaces comprise first and second through-holes for receipt of a screw or rivet;
   (b) a core element comprising a mechanically rigid and thermally conductive material, the core element comprising a plurality of core element through-holes;
   (c) a first valve plunger or valve ball accommodated in the core element and encompassed from above by the at least one actuator so that the first valve plunger or valve ball is adjustable in height;
   (d) a media-tight membrane disposed below the first valve plunger or valve ball;
   (e) a fluid part disposed below the membrane;
   (f) a first valve seat; and
   (g) a lid element;
   wherein adjusting the height of the first valve plunger or valve ball causes the membrane to completely open up, interrupt, or partially open a through-flow of a medium through the fluid part;
   wherein the at least one actuator is either designed for a normally open valve variant or the at least one actuator is designed for a normally closed valve variant and has a first reset element;
   wherein for the normally open valve variant when electricity is supplied to the at least one actuator, the at least one actuator deforms in a direction of the flat memory shape to press the first valve plunger or valve ball against the membrane to cause the membrane to press down on the first valve seat to interrupt the through-flow of the medium through the fluid part;
   wherein for the normally open valve variant when electricity is not supplied to the at least one actuator, the at least one actuator releases the first valve plunger or valve ball to open the through-flow of the medium through the fluid part;
   wherein for the normally closed valve variant when electricity is supplied to the at least one actuator, the at least one actuator deforms in a direction of the flat memory shape to compress the reset element and thereby release the first valve plunger or valve ball to open the through-flow of the medium through the fluid part;
   wherein for the normally closed valve variant when electricity is not supplied to the at least one actuator, the first reset element presses the first valve plunger or valve ball against the membrane to cause the membrane to press down on the first valve seat to interrupt the through-flow of the medium through the fluid part;
   wherein the plurality of core element through-holes are configured for underside connection of the core element with the fluid part and the membrane or for top-side connection with the at least one actuator and the lid element; and
   wherein the first and second electrical contact surfaces and the actuator crosspieces are accommodated within the lid element so as to receive electricity supplied to the at least one actuator.

2. The valve according to claim 1, further comprising an equalization element disposed between the actuator and the lid element and covering the first and second electrical contact surfaces, the equalization element comprising recesses that permit free movement of the actuator crosspieces.

3. The valve according to claim 1,
   wherein the core element is encompassed from above, on a top side, by the lid element, with the at least one actuator interposed between the core element and the lid element;
   wherein the core element is encompassed from below, on an underside, by the fluid part;
   wherein the fluid part has a media inflow and a media outflow;
   wherein the first valve plunger or valve ball closes off a flow connection between the media inflow and the media outflow when the first valve plunger or valve ball is pressed onto the membrane by the at least one actuator so that a flow path within the fluid part is interrupted.

4. The valve according to claim 3,
   wherein the media inflow opens into a media chamber by way of the first valve seat;
   wherein the media chamber is followed, in a flow direction, by the media outflow within the fluid part; and
   wherein the first valve seat is disposed within the media chamber so as to allow interruption or release of the media inflow into the media chamber by the membrane being pressed by the first valve plunger or valve ball into the first valve seat or released to interrupt or release inflow or outflow of the media.

5. The valve according to claim 4,
   wherein the fluid part is screwed onto the core element in releasable manner, by screws distributed around the media chamber of the fluid part;
   wherein the core element through-holes have threads for receipt of the screws; and
   wherein the membrane and the first valve plunger or valve ball are interposed between the fluid part and the core element.

6. The valve according to claim 5, further comprising a sealing element comprising a soft material interposed between the fluid part and the core element to sealingly connect the fluid part with the core element, wherein the sealing element is disposed above the membrane in an installation position.

7. The valve according to claim 6, wherein at least one of the sealing element and the membrane is produced from an elastomer.

8. The valve according to claim 7, wherein the sealing element comprises a central sealing disk attached to thin crosspieces, disposed at a distance from one another and extending inward from a circumferential frame or an inner circumferential structure of the sealing element, in such a manner that the sealing disk is suspended in the frame or the inner circumferential structure of the sealing element so that the sealing disk is moveable toward or away from the first valve seat.

9. The valve according to claim 4, wherein at least one of the fluid part, on the top side, and the core element, on the underside, is provided with a circumferential sealing lip for complete sealing of the membrane relative to the fluid part.

10. The valve according to claim 1, wherein the lid element is screwed onto the core element with the at least one actuator interposed between the core element and the lid element by at least two screws that are spaced apart from one another.

11. The valve according to claim 1,
wherein the at least one actuator is inserted above the core element and below the lid element; and
wherein the core element and the lid element are screwed onto one another, with the at least one actuator interposed between the core element and the lid element.

12. The valve according to claim 1,
wherein the core element is provided, on a top side that faces the at least one actuator element, with at least first and second conductor tracks that are separated from one another; and
wherein the core element is connected with first and second connection poles of an external electricity supply by way of electrical contacts disposed on the core element.

13. The valve according to claim 12, wherein the at least one actuator crosspieces have contact surfaces positioned for connection to the electricity supply in such a manner that conductor lengths formed by the actuator crosspieces have at least essentially an identical length, in each instance, and a uniform cross-section.

14. The valve according to claim 1,
wherein the at least one actuator comprises a reset element having a reset force counteracting a direction of effect of the at least one actuator;
wherein the reset element is clamped in place between the lid element and the first valve plunger or valve ball in such a manner that the reset force is transferred to the first valve plunger or valve ball to thereby close off the flow path of the medium to be switched when the at least one actuator is in a state without electricity being supplied.

15. The valve according to claim 14, wherein the reset element comprises a flat reset spring having a bias adjustable by way of adjusting screws.

16. The valve according to claim 1, wherein the at least one actuator comprises first and second actuators,
wherein
(a) the first actuator is designed for a normally open valve function and the second actuator is designed for a normally closed valve function in connection with the first reset element or (b) the first actuator is designed for a normally closed valve function in connection with the first reset element and the second actuator is designed for a normally open valve function or
(c) both the first actuator and the second actuator are designed for a normally open valve function or
(d) both the first actuator in connection with the first reset element and the second actuator in connection with a second reset element are designed for a normally closed valve function;
wherein the fluid part has first and second media inflows and a common media outflow, as well as separate first and second media chambers connected with one another by way of a channel or by way of the media outflow;
wherein the first media chamber has the first valve seat and the first valve plunger or valve ball and the second media chamber has a second valve seat and a second valve plunger or valve ball; and
wherein the first and second actuators are associated with the first and second media chambers, respectively.

17. The valve according to claim 16, wherein the first actuator is designed for a normally open valve function, and the second actuator, in connection with the first reset element, is designed for a normally closed valve function, wherein the first and second actuators are electrically switched in series by a conductive connection applied to the core element.

18. The valve according to claim 1, further comprising a single component having the core element and a plurality of actuators and valve seats associated with the actuators.

19. The valve according to claim 18, wherein the plurality of actuators are connected with one another electrically by at least one of a parallel circuit and a serial circuit or wherein the plurality of actuators are individually controllable.

20. The valve according to claim 19,
wherein the plurality of actuator elements are combined in an arrangement selected from the group consisting of a line arrangement, a matrix arrangement, and a star arrangement to form the component having an at least divided contact surface;
wherein the core element is connected with further electronic components selected from the group consisting of batteries, capacitors, transistors, micro-controllers, sensors, and electrotechnical control or regulation units; and
wherein the further electronic components are disposed on conductor tracks on one or both sides of the core element.

21. The valve according to claim 18, further comprising a common electrode assigned to the actuator elements of the component, so that in the case of n actuators that can be controlled independently of one another, n+1 connectors are required.

* * * * *